(12) United States Patent
Lyon (10) Patent No.: US 9,327,565 B2
(45) Date of Patent: May 3, 2016

(54) SINGLE-AXLE TRACTOR

(71) Applicant: Mark Lyon, Whitesboro, TX (US)

(72) Inventor: Mark Lyon, Whitesboro, TX (US)

( * ) Notice: Subject to any disclaimer, the term of this patent is extended or adjusted under 35 U.S.C. 154(b) by 247 days.

(21) Appl. No.: 13/935,614

(22) Filed: Jul. 5, 2013

(65) Prior Publication Data

US 2015/0008060 A1  Jan. 8, 2015

(51) Int. Cl.
| | |
|---|---|
| *B62D 53/02* | (2006.01) |
| *B60D 1/06* | (2006.01) |
| *B60D 1/07* | (2006.01) |
| *B60D 1/24* | (2006.01) |
| *B60D 1/52* | (2006.01) |

(52) U.S. Cl.
CPC .. *B60D 1/06* (2013.01); *B60D 1/07* (2013.01); *B60D 1/247* (2013.01); *B60D 1/52* (2013.01); *B62D 53/021* (2013.01); *B62D 53/02* (2013.01)

(58) Field of Classification Search
CPC ................................. B60D 1/247; B62D 53/02
USPC ............................................... 280/405.1, 503
See application file for complete search history.

(56) References Cited

U.S. PATENT DOCUMENTS

| | | | | |
|---|---|---|---|---|
| 2,918,308 | A * | 12/1959 | Lowman | 280/406.2 |
| 4,202,562 | A * | 5/1980 | Sorenson | 280/415.1 |
| 4,211,427 | A * | 7/1980 | Young et al. | 280/406.2 |
| 2011/0156372 | A1* | 6/2011 | Harper et al. | 280/515 |
| 2012/0205893 | A1* | 8/2012 | Singh | 280/405.1 |

* cited by examiner

*Primary Examiner* — Tony Winner

(74) *Attorney, Agent, or Firm* — Warren V. Norred; Norred Law, PLLC

(57) ABSTRACT

A single-axle tractor for moving trailers and wheeled cargo. The single-axle tractor of the present disclosure provides a compact, efficient, reliable, cost-effective means of moving cargo from one place to another using torque generated by an on-board motor. The tractor includes a structure to provide rigidity to a tractor-trailer combination while providing reasonable roll compliance.

9 Claims, 9 Drawing Sheets

DRAWING LEGEND 100 trailer-trailer combination
102 single-axle tractor
104 single-axle trailer
106 ball hitch
108 hitch receiver
110 frame member
112 vertical frame
114, 116 pair of tractor wheels
118 cover
120 trailer frame
122, 124 trailer wheels
130 stabilizer frame
132, 134 stabilizer links
136 stabilizer frame tie
200 tractor-trailer combo 2
202 rotationally-compliant joint 204 pitch control bar
206 pitch control bar tie
220 axle
222 motor
224 power source
226 power output
228 transmission
230 grill
300 tractor-trailer combo
400 tractor frame assembly
402 frame
404, 406 drive wheels
408, 410 wheel motors
412 steering cylinder
414 receiver carrier

SINGLE-AXLE TRACTOR

TECHNICAL FIELD OF THE DISCLOSURE

The present disclosure relates generally to the field of cargo movement and, more particularly, to a device for efficient movement of trailers and towable loads.

BACKGROUND OF THE DISCLOSURE

When it is necessary or desirable to move cargo from one place to another, it is very common to make use of a cargo trailer. A trailer is generally characterized by one or more axles riding on wheels and tires. Heavy-duty trailers tend to have suspension mechanisms similar to those found in cars and trucks, while light-duty trailers often mount the axle or axles directly to the trailer frame. Generally, trailers are designed to be moved using trucks, tractors, four-wheelers, forklifts and similar vehicles. Trailers can also be moved using human effort, but this is generally only suitable for small, light-duty trailers.

SUMMARY OF THE DISCLOSURE

The present disclosure provides a single-axle tractor suitable for moving light- and medium-duty trailers carrying a load which may be too large to allow for easy manipulation by human power.

According to one embodiment, the tractor comprises a tractor frame with a motor, having a power output, mounted thereto. An axle is operably connected to the tractor frame and the power output. A hitch is connected to the tractor frame. A stabilizer frame is operably connected to the tractor frame at a first point on the tractor frame.

Depending on the application, the tractor may be powered by an electric motor, a gasoline-powered engine, a diesel-powered engine, or any other suitable power plant. It may channel the mechanical energy generated by the motor via a gearbox, a chain-and-sprocket transmission, a hydraulic transmission, or any other suitable power transmission mechanism.

Other features and advantages of the present disclosure will be apparent to those of ordinary skill in the art upon reference to the following detailed description taken in conjunction with the accompanying drawings.

BRIEF DESCRIPTION OF THE DRAWINGS

For a better understanding of the disclosure, and to show by way of example how the same may be carried into effect, reference is now made to the detailed description of the disclosure along with the accompanying figures in which corresponding numerals in the different figures refer to corresponding parts and in which.

DETAILED DESCRIPTION OF THE DISCLOSURE

While the making and using of various embodiments of the present disclosure are discussed in detail below, it should be appreciated that the present disclosure provides many applicable inventive concepts, which can be embodied in a wide variety of specific contexts. The disclosure is primarily described and illustrated hereinafter in conjunction with various embodiments of a single-axle tractor. The specific embodiments discussed herein are, however, merely illustrative of specific ways to make and use the disclosure and do not limit the scope of the disclosure to the specific context disclosed.

Figure 1:
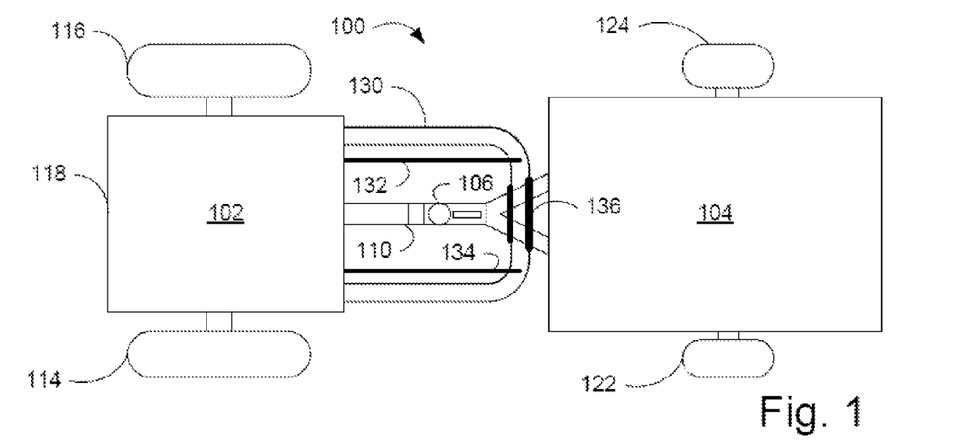
FIG. 1 is a top view of a tractor-trailer combination according to certain aspects of the present disclosure.
Figure 2:
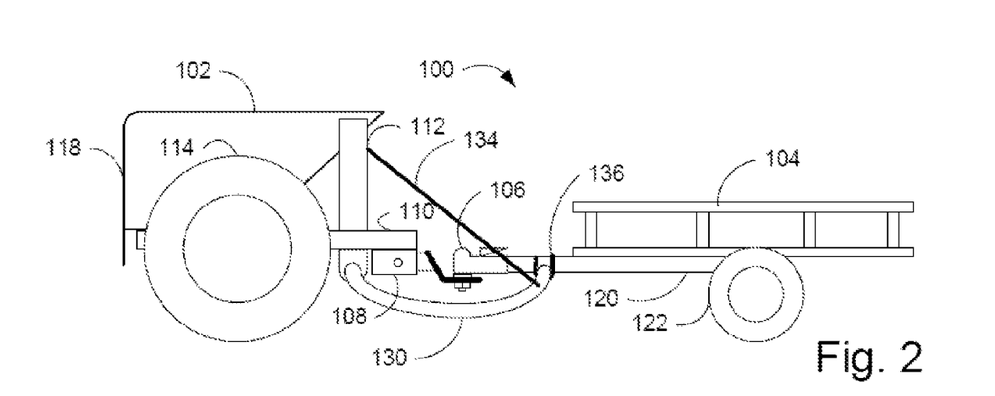
FIG. 2 is a side view of the tractor-trailer combination of FIG. 1.

FIGS. 1 and 2 present top and side views, respectively, of one embodiment of a trailer-trailer combination 100 according to the present disclosure. Tractor-trailer combo 100 comprises single-axle tractor 102 and single-axle trailer 104 connected by ball hitch 106, which is disposed in hitch receiver 108 mounted to tractor horizontal frame member 110. The tractor's frame further comprises tractor vertical frame 112. A pair of tractor wheels 114, 116 is also mounted to tractor horizontal frame member 110. A cover 118 encloses and protects the functional components. Single-axle trailer 104 comprises trailer frame 120 having trailer wheels 122, 124 mounted thereto.

In a traditional tractor-trailer combination employing a single-axle trailer, static and dynamic stability is generally provided by the tractor portion of the combination. As noted previously, the tractor portion is generally a four-wheeled vehicle having sufficient stability to control the ball hitch, and thus the trailer, so long as the trailer inertia and dynamic behavior are within an acceptable range for the size and capability of the tractor vehicle.

The ball hitch is a ball-and-socket joint intentionally designed to provide a wide range of freedom of movement between a tractor vehicle and a trailer. In the traditional arrangement described above, the tractor vehicle provides the static and dynamic stability and control for the combination. One contributing factor toward this advantageous behavior is the fact that the center of mass of the tractor vehicle is ordinarily disposed forward of the rear axle of the tractor vehicle and behind the front axle thereof. Thus, at rest, the receiver—and thus the ball hitch—may be held steady at a fixed distance above the ground. During movement of the tractor vehicle over rough terrain, the receiver will generally move up and down with the frame of the vehicle, but will return to its neutral position on flat terrain or at rest.

Owing to the single-axle architecture of tractor 102, ball hitch 106 will not, when disconnected, settle to a neutral height at rest. Depending on whether the center of mass of tractor 102 is in front of the axle or behind it, ball hitch 106 will tend to rest on the ground or well above the surface.

Those of skill in the art will appreciate that trailer 104 will tend to exhibit the same behavior. Thus, in the absence of additional limiting structure, ball hitch 106 will tend to rest on the ground or well above the surface. Neither is conducive to proper and efficient operation of tractor-trailer combo 100. In order for tractor-trailer combo 100 to operate properly, both tractor 102 and trailer 104 should be disposed substantially level to the ground, with ball hitch 106 disposed proximate to a plane defined generally by the axis of the two axles.

In order to limit, control and stabilize the movement of tractor 102 and trailer 104 about ball hitch 106, the present disclosure incorporates certain suitable structures. As a first example showing the use of such structures, shown in FIGS. 1 and 2, stabilizer frame 130 runs back on two sides from the tractor horizontal frame member 110, and then across underneath trailer frame 120. In certain embodiments, stabilizer frame 130, trailer frame 120, or both, may incorporate certain mating features or structures in order to facilitate proper securement. As an example, one or more half-circle cuts may be made in trailer frame 120 to conform to the rounded upper profile of a round stabilizer frame 130.

In certain embodiments, including the embodiment shown in FIGS. 1 and 2, stabilizer frame 130 may be secured to trailer frame 120 by a suitable link, connector or fastener mechanism. This mechanism is shown and represented by stabilizer frame tie 136. Depending on the application, stabilizer frame tie 136 may be flexible or rigid, and may provide for substantial movement, slight movement or no movement at all. Structures that may be employed for this purpose include chains, springs, u-bolts, band clamps, cable, rope, wire, bolts, screws, pins, locks, ratchet straps, shock absorbers and turnbuckles, as examples.

In certain embodiments, the stability of the tractor-trailer combination 100 may be improved by the use of other structures, either alone or in combination with the above-described elements. Examples are represented by stabilizer links 132, 134, which run between tractor vertical frame member 112 and stabilizer frame 130. Depending on the embodiment, stabilizer links may be compliant or rigid, and may provide for substantial movement, slight movement or no movement at all. Structures that may be employed as stabilizer links 132, 134 include turnbuckles, chains, springs, gas pistons, threaded rods, band clamps, cables, ropes, wire, bolts, screws, pins, ratchet straps and shock absorbers, as examples.

Figure 3:
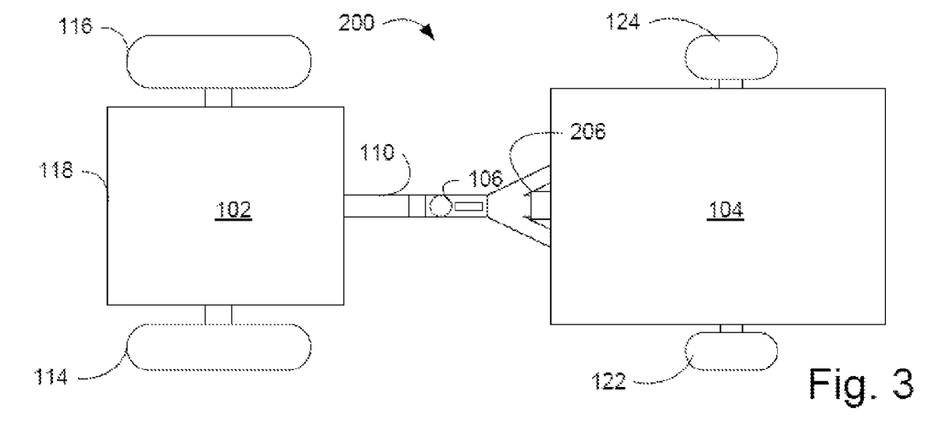
FIG. 3 is a top view of a second embodiment of a tractor-trailer combination according to certain aspects of the present disclosure.
Figure 4:
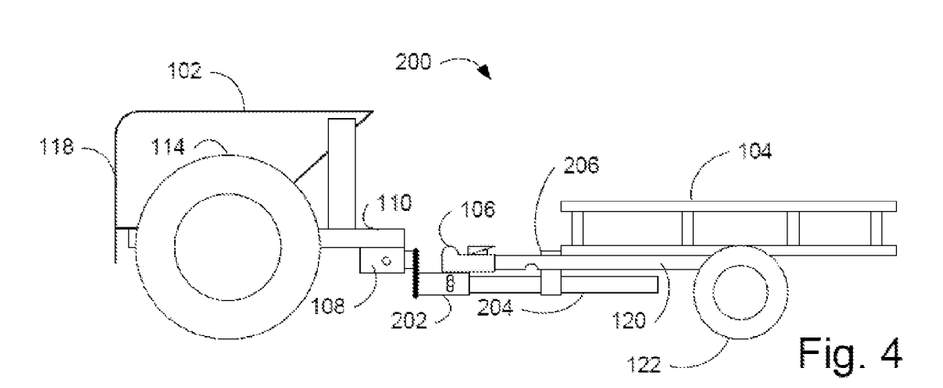
FIG. 4 is a side view of the tractor-trailer combination of FIG. 3.

FIGS. 3 and 4 present top and side views, respectively, of a second embodiment of a tractor-trailer combination according to the present disclosure. As a general matter, tractor-trailer combo 200 is very similar to tractor-trailer combo 100 as regards the structure of tractor 102 and trailer 104. Those of skill in the art will note, however, that tractor-trailer combo 200 employs a different set of structures for the purpose of stabilizing the combination.

In a similar manner to that described above in connection with combo 100 of FIGS. 1 and 2, combo 200 joins the tractor 102 and trailer 104 at ball joint 106. In this embodiment, however, ball joint 106 is not mounted directly to receiver 108. Instead, ball joint 106 is mounted to rotationally-compliant joint 202 and pitch control bar 204. Pitch control bar 204 is, in turn, secured to trailer frame 120 by pitch control bar tie 206. This design allows for a substantial degree of roll freedom between tractor 102 and 104, and thus may be more suitable for applications wherein the tractor 102 and trailer 104 are likely to encounter uneven terrain. Depending on the embodiment, pitch control bar tie 206 may be compliant or rigid, and may provide for substantial movement, slight movement or no movement at all. Structures that may be employed as a pitch control bar tie 206 include chains, springs, u-bolts, band clamps, cable, rope, wire, bolts, screws, pins, locks, ratchet straps, shock absorbers and turnbuckles, as examples.

Figure 5:
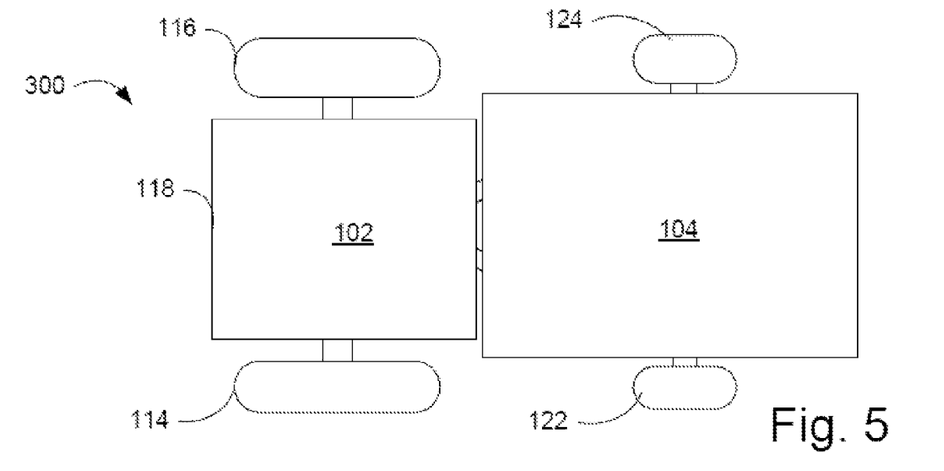
FIG. 5 is a top view of a third embodiment of a tractor-trailer combination according to certain aspects of the present disclosure.
Figure 6:
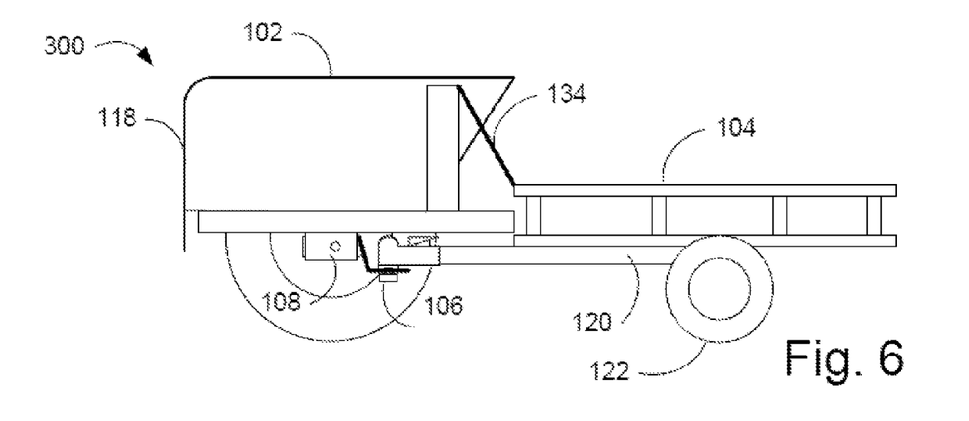
FIG. 6 is a side view of the tractor-trailer combination of FIG. 5.

FIGS. 5 and 6 depict a third embodiment of a tractor-trailer combo 300. This combo is similar to combos 100 and 200, but is distinct by the nature of the fact that the hitch receiver 108 is disposed well underneath the frame of tractor 102, such that the rear of tractor 102 sits adjacent to the front of the payload area of trailer 104 and the neck of trailer 104 is disposed underneath tractor 102. In this embodiment, stabilizer links 132 and 134 are attached to a suitable portion of trailer 104, to further aid stability.

Figure 7:
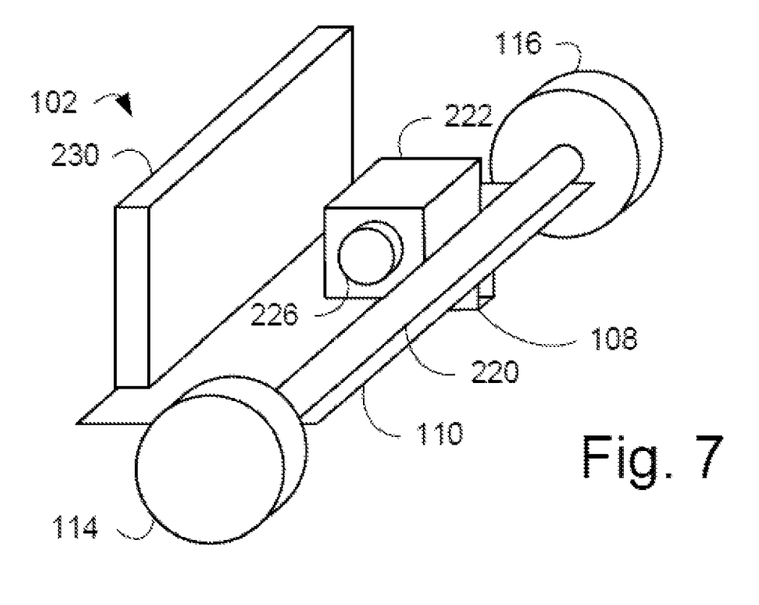
FIG. 7 is an oblique view of a tractor according to certain aspects of the present disclosure.
Figure 8:
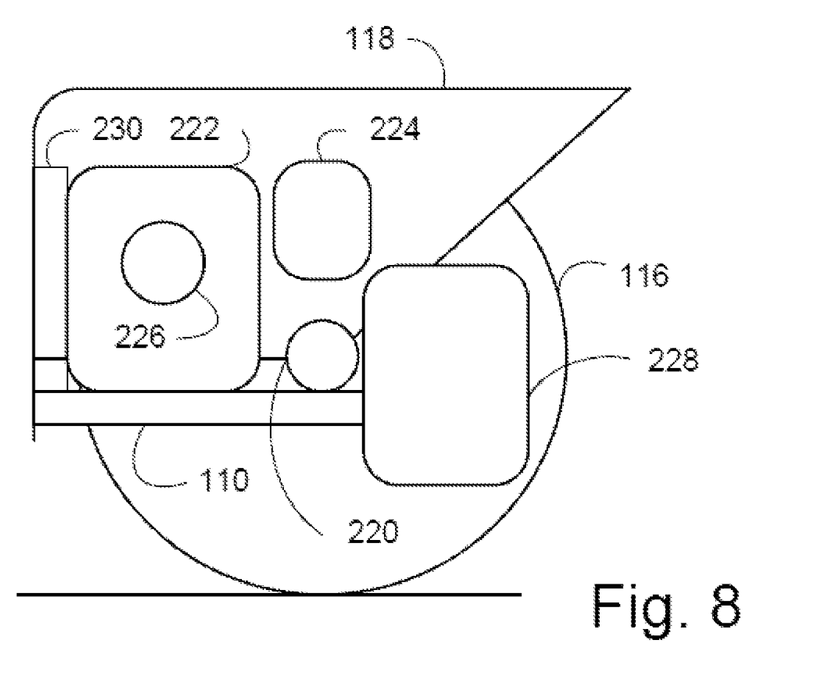
FIG. 8 is a side cutaway view of a tractor according to certain aspects of the present disclosure.
Figure 9:
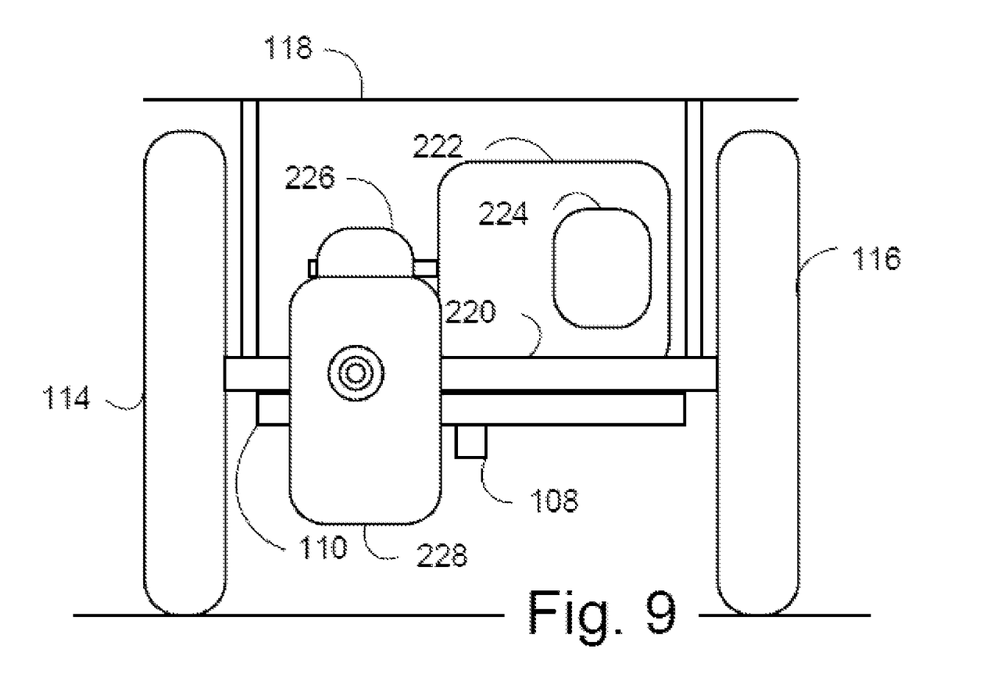
FIG. 9 is a rear view of a tractor according to certain aspects of the present disclosure.

FIGS. 7, 8 and 9 present oblique, side and rear views, respectively, of a single-axle trailer according to certain aspects of the present disclosure. Tractor wheels 114, 116 are mounted to axle 220, which is powered by transmission 228. Transmission 228 may be any form of suitable power transmission device known to those of skill in the art, including hydraulic transmissions, gear transmissions, chain transmissions and belt-and-pulley transmissions. Depending on the application, transmission 228 may incorporate a speed reducer, a torque converter, one or more clutches and other appropriate mechanisms and functional components.

Transmission 228 receives power from a mechanical apparatus represented by power output 226, which may be a hydraulic pump, a drive pulley, a worm gear, a pinion gear or a flywheel, as examples. The key function of transmission 228 is that it receives and conveys power from motor 222 to transmission 228.

Depending on the application, motor 222 may be any form of suitable power generation device, including an AC or DC electric motor, a four-cycle internal combustion engine, a two-cycle internal combustion engine, a rotary engine, a diesel engine, an air motor and a hydraulic motor, as examples. If motor 222 is an internal combustion engine, it may be the type to run on gasoline, propane, ethanol, methanol or some combination thereof. Cooling of motor 222 may be via air-cooling or water-cooling, as appropriate, and may be active or passive.

Motor 222 receives fuel or voltage, as appropriate, from power source 224. For embodiments employing a combustion engine, power source 224 may be a fuel reservoir suitable for storing fuel in a liquid or gas phase, as necessary. For embodiments employing an electric motor, power source 224 may comprise a battery, fuel cell, solar panel or some combination thereof. For embodiments employing an air or hydraulic motor, power source 224 may be a pressurized tank, cylinder or canister of an appropriate fluid.

Grill 230 provides for air flow and cooling of the tractor components, and may incorporate a powered fan, a radiator, a water pump, a thermostat or any combination thereof, for this purpose.

Figure 10:
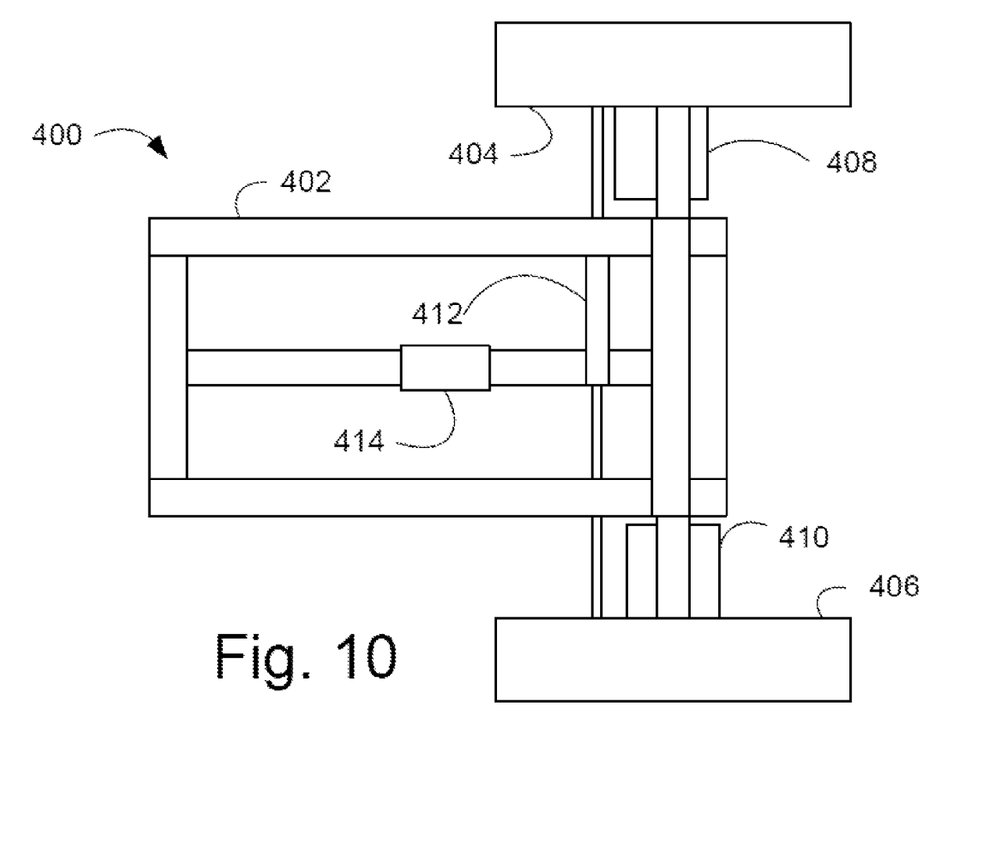
FIG. 10 is a top view of a tractor frame according to certain aspects of the present disclosure.
Figure 11:
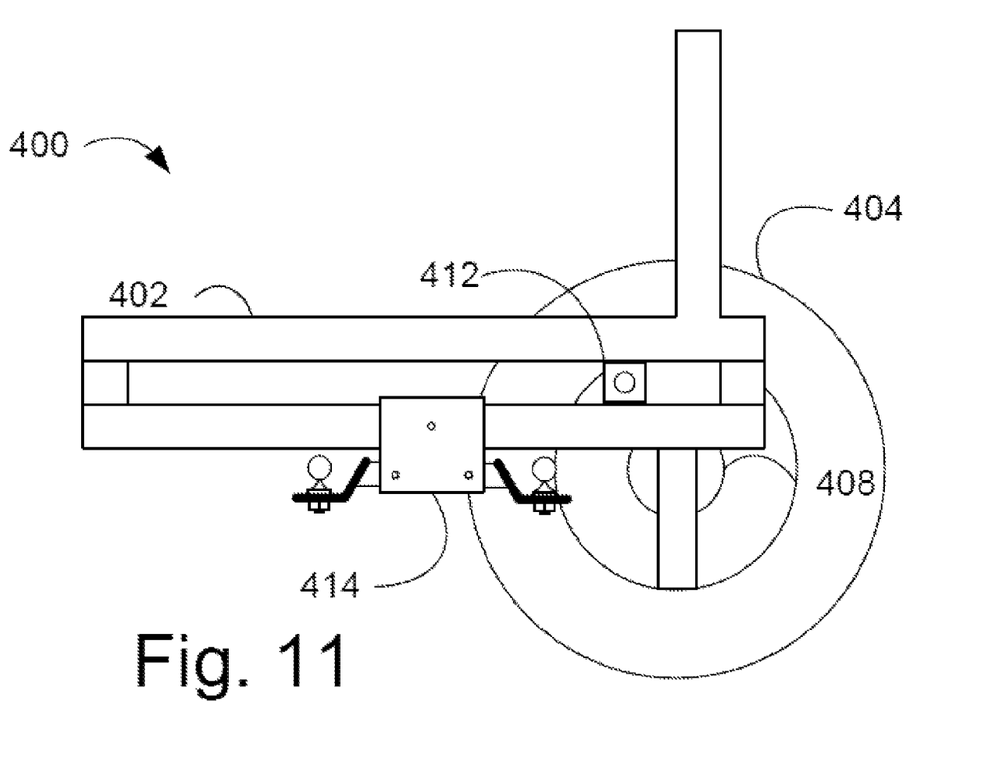
FIG. 11 is a side view of a tractor frame according to certain aspects of the present disclosure.
Figure 12:
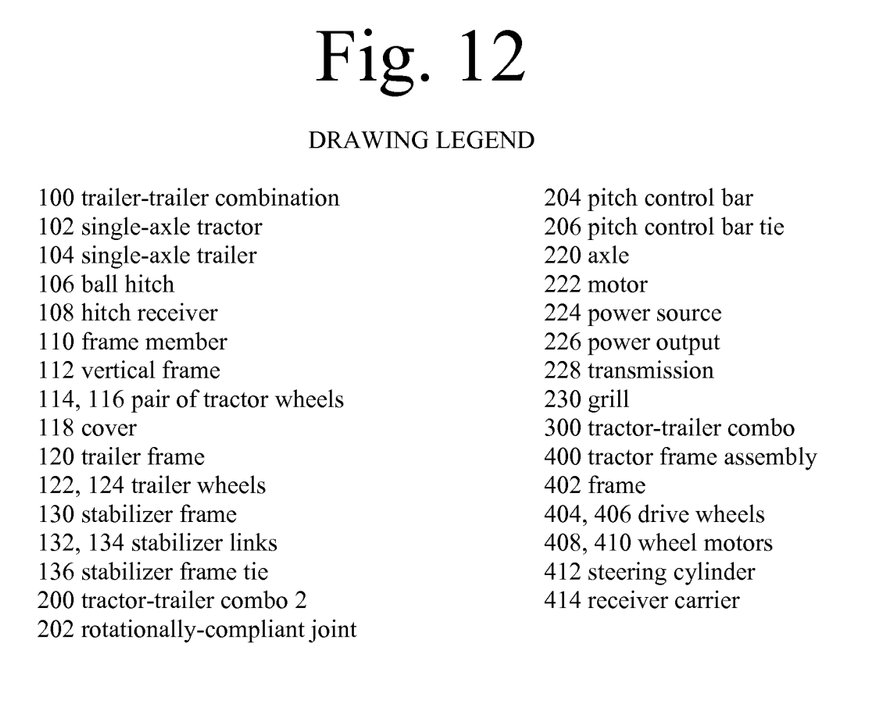
FIG. 12 is a legend for the drawings.

FIGS. 10 and 11 are top and side views, respectively, of a tractor frame assembly 400 according to certain aspects of the present disclosure. Frame assembly 400 comprises frame 402, to which are attached drive wheels 404, 406. Wheel motors 408, 410 are secured to, and provide power to, drive wheels 404, 406. Wheel motors 408, 410 may be, as examples, electric motors or hydraulic motors. Drive wheels 404, 406 may be pivoted about their vertical axes by steering cylinder 412. A receiver carrier 414 is disposed on a center rail of frame 402, and may be secured at one of a number of positions along the center rail, in order to allow for flexibility in the position of ball hitches. Additional receiver locations may be built into either or both ends of frame 402.

The embodiments and examples set forth above are presented to best explain the present disclosure and its practical application and to thereby enable those skilled in the art to make and utilize the disclosure. As previously explained, those skilled in the art will recognize that the foregoing description and examples have been presented for the purpose of illustration and example only. The description as set forth is not intended to be exhaustive or to limit the disclosure to the precise form disclosed. Many modifications and variations are possible in light of the above teaching without departing from the spirit and scope of the present disclosure.

What is claimed is:

1. A single-axle tractor comprising:
   a) a tractor frame;
   b) a motor, having a power output, mounted to the tractor frame;
   c) said single-axle, operably connected to the tractor frame and the power output;
   d) a hitch connected to the tractor frame; and
   e) a rigid stabilizer frame operably connected to the tractor frame at a first point on the tractor frame which ensures that the tractor's axle maintains a fixed position relative to a trailer frame.

2. The tractor of claim 1, wherein the hitch is a ball hitch.

3. The tractor of claim 1, further comprising at least one stabilizer link connected to the tractor frame at its proximal end and to the stabilizer frame at its distal end.

4. The tractor of claim 1, further comprising a stabilizer frame tie shaped and sized to secure the stabilizer frame to a trailer frame.

5. The tractor of claim 1, wherein the motor is a gasoline-powered motor.

6. The tractor of claim 1, further comprising a transmission disposed between the motor and the axle.

7. The tractor of claim 6, wherein the transmission is a hydraulic transmission.

8. The tractor of claim 1, wherein the motor is an electric motor.

9. The tractor of claim 1, in which:
   a) the hitch receiver is mounted near the tractor axle;
   b) multiple rigid stabilizer links are attached between the trailer and tractor at spatially diverse mounting points.

* * * * *